United States Patent
Klockow et al.

(10) Patent No.: US 8,986,403 B2
(45) Date of Patent: Mar. 24, 2015

(54) GASIFICATION SYSTEM FLOW DAMPING

(75) Inventors: Helge B. Klockow, Niskayuna, NY (US); James Michael Storey, Houston, TX (US); Aaron John Avagliano, Houston, TX (US); Guoqing Wang, Houston, TX (US); Gary Dwayne Mandrusiak, Latham, NY (US); Karl Hardcastle, Saratoga Springs, NY (US); Scott Parent, Houston, TX (US); Prashant Tiwari, Niskayuna, NY (US); Gregory Laskowski, Saratoga Springs, NY (US); Judeth Brannon Corry, Manvel, TX (US); Constantin Dinu, Katy, TX (US)

(73) Assignee: General Electric Company, Niskayuna, NY (US)

( * ) Notice: Subject to any disclaimer, the term of this patent is extended or adjusted under 35 U.S.C. 154(b) by 903 days.

(21) Appl. No.: 12/495,439

(22) Filed: Jun. 30, 2009

(65) Prior Publication Data

US 2010/0325957 A1    Dec. 30, 2010

(51) Int. Cl.
*B01J 7/00* (2006.01)
*C10J 3/84* (2006.01)
*C10K 1/00* (2006.01)
*C10K 1/08* (2006.01)
*C10K 1/10* (2006.01)

(52) U.S. Cl.
CPC .. *C10J 3/84* (2013.01); *C10J 3/845* (2013.01); *C10K 1/003* (2013.01); *C10K 1/004* (2013.01); *C10K 1/08* (2013.01); *C10K 1/101* (2013.01); *Y02E 20/18* (2013.01); *C10J 2300/1653* (2013.01); *C10J 2300/1671* (2013.01)

USPC ............................................................. 48/61

(58) Field of Classification Search
CPC ......... C10J 3/845; C10J 3/485; C10J 2200/09
See application file for complete search history.

(56) References Cited

U.S. PATENT DOCUMENTS 4,108,236 A * 8/1978 Salkeld ........................ 164/513
4,218,423 A    8/1980 Robin et al.
(Continued)

FOREIGN PATENT DOCUMENTS

CN    2036938 U    5/1989
CN    1322795 A    11/2001
(Continued)

OTHER PUBLICATIONS

Search Report and Written Opinion from corresponding EP Application No. 11192781.0-1270 dated Jun. 13, 2012.
(Continued)

*Primary Examiner* — Imran Akram
(74) *Attorney, Agent, or Firm* — Ann M. Agosti

(57) ABSTRACT

In one embodiment, a gasification system component, such as a quench unit or scrubber may retain of pool of a cooling fluid for cooling another fluid. The gasification system component includes a flow damping mechanism designed to dampen flow of the cooling fluid, the other fluid, or both, within the gasification system component. The flow damping mechanism may be disposed in an inner chamber formed between a dip tube and a draft tube or disposed in an outer chamber formed between the walls of the gasification system component and the draft tube. The flow damping mechanism also may be disposed between the inner chamber and the outer chamber.

7 Claims, 9 Drawing Sheets

(56) References Cited

U.S. PATENT DOCUMENTS

| | | | |
|---|---|---|---|
| 4,252,543 A | 2/1981 | Giles | |
| 4,300,913 A | 11/1981 | Egert et al. | |
| 4,444,726 A | 4/1984 | Crotty, Jr. et al. | |
| 4,466,808 A | 8/1984 | Koog | |
| 4,494,963 A | 1/1985 | Reich | |
| 4,581,899 A * | 4/1986 | von Klock et al. | 62/64 |
| 4,605,423 A | 8/1986 | Koog | |
| 4,778,483 A | 10/1988 | Martin et al. | |
| 4,828,579 A | 5/1989 | Becker et al. | |
| 4,828,580 A | 5/1989 | Dach | |
| 5,520,714 A | 5/1996 | Muschelknautz | |
| 6,027,609 A * | 2/2000 | Nilsson | 162/30.1 |
| 7,090,707 B1 | 8/2006 | Barot | |
| 2006/0260192 A1 | 11/2006 | Barot | |
| 2007/0186473 A1* | 8/2007 | Wallace | 48/197 R |
| 2008/0175770 A1 | 7/2008 | Wallace | |
| 2009/0047193 A1 | 2/2009 | Corry et al. | |
| 2009/0202403 A1 | 8/2009 | Jimenez-Huyke et al. | |
| 2010/0143216 A1* | 6/2010 | Ten Bosch et al. | 422/207 |
| 2010/0263278 A1* | 10/2010 | Kowoll et al. | 48/67 |
| 2010/0288474 A1* | 11/2010 | Dinu et al. | 165/119 |
| 2010/0325957 A1 | 12/2010 | Klockow et al. | |

FOREIGN PATENT DOCUMENTS

| | | |
|---|---|---|
| CN | 1327031 A | 12/2001 |
| CN | 2492765 Y | 5/2002 |
| CN | 1544124 A | 11/2004 |
| JP | 33006765 B | 8/1958 |
| JP | 0454717 B2 | 9/1992 |
| JP | 10212487 A | 8/1998 |
| WO | WO2009014802 | 1/2009 |
| WO | 2009023364 A2 | 2/2009 |
| WO | WO2009042274 | 4/2009 |

OTHER PUBLICATIONS

Japanese Office Action issued in connection with corresponding JP Application No. 2010-147045 on Aug. 5, 2014.

* cited by examiner

GASIFICATION SYSTEM FLOW DAMPING

CROSS-REFERENCE TO RELATED APPLICATIONS

This application is related to the following co-pending U.S. patent application Ser. No. 12/494,434 entitled "COOLING CHAMBER ASSEMBLY FOR A GASIFIER" and Ser. No. 12/494,385 entitled "QUENCH CHAMBER ASSEMBLY FOR A GASIFIER" assigned to the same assignee as this application and filed concurrently herewith, each of which is hereby incorporated by reference in its entirety for all purposes.

BACKGROUND OF THE INVENTION

The subject matter disclosed herein relates to gasification system components and more specifically, to flow damping mechanisms within gasification system components, such as quench units and scrubbers.

Fossil fuels, such as coal or petroleum, may be gasified for use in the production of electricity, chemicals, synthetic fuels, or for a variety of other applications. Gasification involves reacting a carbonaceous fuel and oxygen at a very high temperature to produce syngas, a fuel containing carbon monoxide and hydrogen, which burns more efficiently and cleaner than the fuel in its original state.

Upon gasification, the resulting syngas may include less desirable components, such as ash. Accordingly, the syngas may be directed through a quench unit to cool the syngas to a saturation temperature and remove less desirable components as slag. However, flow fluctuations may exist within the quench unit that may reduce the efficiency of the quench unit. From the quench unit the syngas may be directed through a scrubber, which may remove water and/or any remaining particulates from the syngas. However, flow fluctuations may exist within the scrubber that may reduce the efficiency of the scrubber.

BRIEF DESCRIPTION OF THE INVENTION

In one embodiment, a gasification system component includes a vessel configured to retain a pool of a cooling fluid, a dip tube disposed in the vessel to direct another fluid towards the pool, a draft tube encircling the dip tube to form an inner chamber between the dip tube and the draft tube and an outer chamber between the draft tube and the vessel walls, and one or more flow damping mechanisms disposed in one or more of the inner chamber, the outer chamber, or therebetween, and configured to dampen flow of the cooling fluid, the another fluid, or both within the quench unit.

In another embodiment, a gasification system component includes a vessel configured to retain a pool of a cooling fluid within a lower section of the vessel, a dip tube disposed annularly within the vessel and configured to direct another fluid within the vessel toward the pool, a draft tube disposed annularly within the vessel to form an outer annular chamber between the draft tube and the vessel walls and configured to direct another fluid within the vessel away from the pool, and a flow damping mechanism disposed in the outer chamber to reduce a flow area through the outer chamber by at least approximately 50 percent.

In yet another embodiment, a gasification system component includes a vessel configured to retain a pool of a cooling fluid, a dip tube disposed in the vessel to direct another towards the pool and to create an annular chamber between the dip tube and walls of the vessel, and one or more flow damping mechanisms disposed in the annular chamber and configured to dampen flow of the cooling fluid, the another fluid, or both within the gasification system component.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
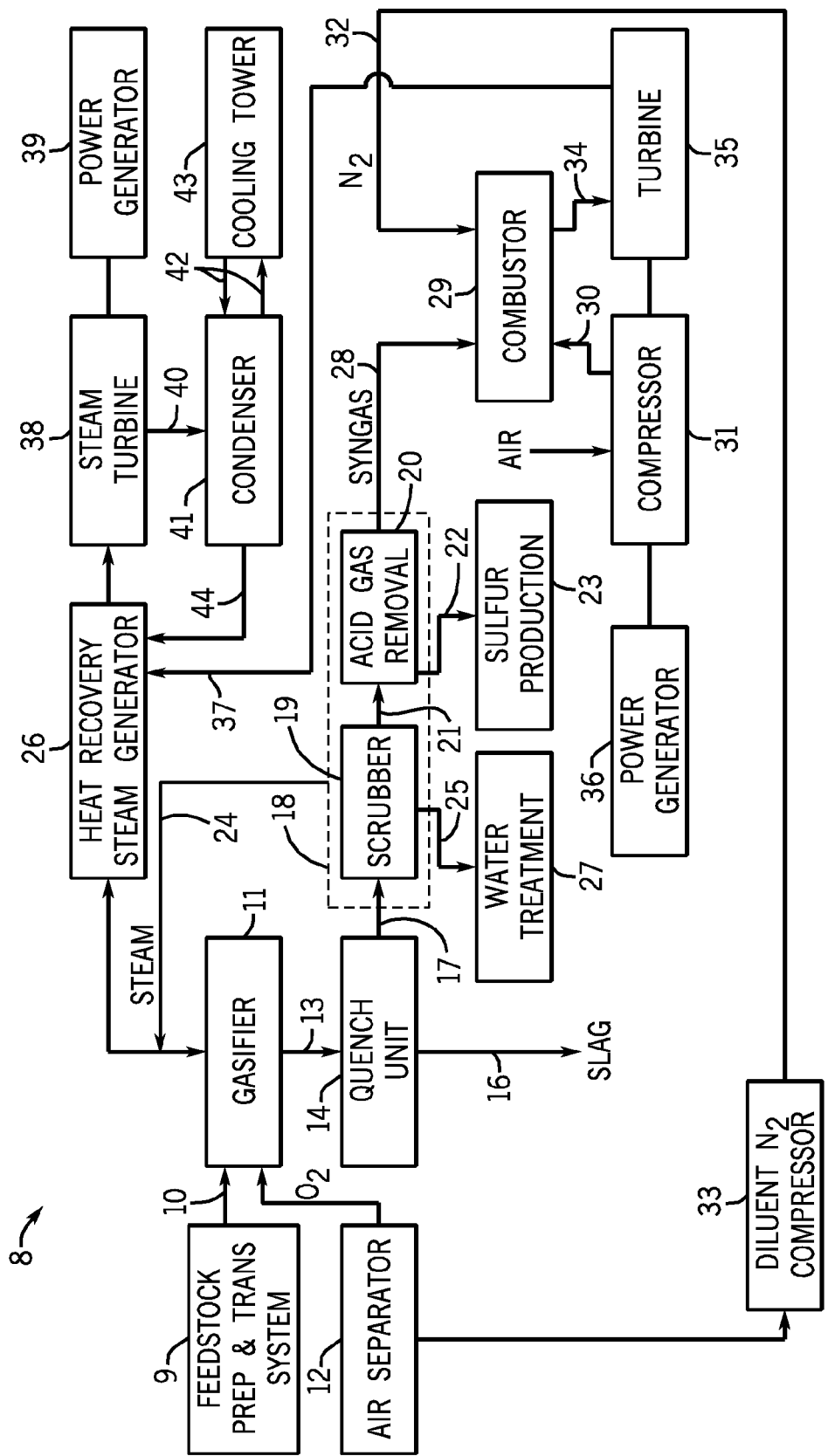
FIG. 1 is a block diagram of an embodiment of an integrated gasification combined cycle power generation system that may employ a quench unit and a scrubber.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to techniques for controlling flow dynamics within gasification system components, such as quench units and/or scrubbers. In general, quench units may receive hot effluent, such as syngas, from a gasification chamber. The hot effluent may be directed through a pool of cooling fluid within the quench unit to produce cooler, saturated (or partially saturated) syngas. Upon cooling, components, such as ash, may solidify within the pool of liquid for subsequent removal from the quench unit. From the quench unit, the cooler syngas may be directed to a scrubber. In generally, the syngas may flow through a pool of cooling fluid within the scrubber to remove any remaining particulates and/or entrained water from the syngas. During operation, the quench unit and/or the scrubber may experience flow fluctuations, such as fluctuations in cooling pool levels, gas flow rates, and/or pressure levels, which, in turn, may cause inefficient cooling or entrainment of cooling fluid within the syngas exiting the quench unit and/or the scrubber.

Accordingly, the present disclosure describes gasification system components, such as quench units and/or scrubbers, that include flow damping mechanisms designed to minimize flow fluctuations within the gasification system component. As used herein, the term "damping" may generally refer to reducing fluctuations or oscillations in flow and/or to reducing the intensity of flow oscillations. For example, the flow damping mechanisms may be designed to dissipate energy from flow fluctuations and/or to redirect uneven flow within the quench unit. In certain embodiments, the flow damping mechanisms may be disposed within the pool of liquid coolant to dampen fluctuations in the level of the pool, which in turn may reduce fluctuations in pressure and/or fluctuations in gas flow rate. For example, damping baffles may be disposed within the pool of liquid to restrict the flow area through the pool. In certain embodiments, the damping baffles may be designed to reduce the flow path area for the liquid by at least approximately fifty percent. The flow damping mechanisms also may be disposed within the gas flow path to control the pressure drop, which in turn may reduce fluctuations in the liquid pool levels and/or the gas flow rate.

FIG. 1 illustrates an embodiment of an integrated gasification combined cycle (IGCC) power generation system 8. Within the power generation system, gas, such as syngas, may be combusted to generate power within a "topping," or Brayton, cycle. Exhaust gas from the "topping" cycle may then be used to generate steam within a "bottoming," or Rankine, cycle.

To produce syngas, carbonaceous fuel, such as coke and lignite, may be introduced to the system 8 via a feedstock preparation and transportation system 9. The feed system 9 provides fuel slurry 10 to a gasifier 11, where the fuel is mixed with oxygen ($O_2$) and steam ($H_2O$). The oxygen may be provided from an air separator 12. The gasifier 11 heats the reactants to over approximately 700° C. in order to combust the volatile components in the fuel slurry to produce hot effluent, such as syngas 13. Due to chemical reactions between the oxygen, steam, and carbon (C), the syngas 13 may include hydrogen ($H_2$), carbon monoxide (CO), and carbon dioxide ($CO_2$) as well as other less desirable components, such as ash, sulfur, nitrogen, and chloride, present in the carbonaceous fuel.

From the gasifier 11, the syngas 13 may enter a quench unit 14. In certain embodiments, the quench unit 14 may be integral with the gasifier 11. However, in other embodiments, the quench unit 14 may be a separate unit. The quench unit 14 may cool the syngas 13 to at or near a saturation temperature through evaporation of a cooling fluid, such as water. During the cooling process, less desirable components, such as ash, may solidify and be removed from the quench unit 14 as slag 16. As the syngas 13 flows through the quench unit 14, the syngas 13 may be cooled to produce cooled syngas 17 that may exit the quench unit 14 and enter a gas cooling and treating system 18.

The gas cooling and treatment system 18 may include a scrubber 19 and an acid gas removal system 20, as well as other components. Within the gas cooling and treatment system 18, the syngas 17 from the quench unit 14 may enter the scrubber 19 where the syngas 17 may be further cooled to remove entrained water and/or remaining particulates. The scrubbed syngas 21 may exit the scrubber 19 and enter an acid gas removal system 20 where acid gases, such as carbon dioxide and hydrogen sulfide. Within the gas cooling and treatment system 18, sulfur components 22 may be removed and sent to a sulfur production system 23 for purification. Water also may be removed as a steam 24 and a liquid 25. The steam 24 may be recycled to the gasifier 11 and/or sent to a heat recovery steam generator (HRSG) system 26. The liquid water 25 may be sent to a water treatment system 27.

The gas cooling and treatment system 18 may produce sweetened syngas 28, which may be directed to a combustor 29 where the syngas 28 is combusted to generate power within the "topping" cycle. Air 30 may be provided to the combustor 29 from a compressor 31 to mix with the syngas 28 in a fuel-air ratio for combustion. Further, the combustor 29 may receive nitrogen 32 from the air separator 12 via a diluent nitrogen compressor 33 to cool the combustion reaction.

Exhaust 34 from the combustor 29 may flow through a turbine 35, which may drive the compressor 31 and/or an electrical generator 36 and produce exhaust 37. The exhaust 37 may then be directed to the HRSG system 26, which may recover heat from the exhaust 37 and from the steam 24 fed from the gas cooling and treating system 18. The recovered heat may be used to drive a steam turbine 38 to generate power within the "bottoming" cycle. For example, the steam turbine 38 may drive a generator 39 to generate electricity. Steam 40 from the steam turbine 38 may then be directed to a condenser 41, where the steam may be cooled by cooling fluid 42 from a cooling tower 43. The condensed steam 44 from the condenser 41 may then be recycled to the HRSG system 26.

As may be appreciated, the power generation system 8 is provided by way of example only and is not intended to be limiting. The flow damping mechanisms described herein may be employed within the quench unit 14 and/or the scrubber 19 to dampen flow fluctuations. However, in other embodiments, the flow damping mechanisms may be employed within any type of gasification quench unit and/or scrubber. For example, the flow damping mechanisms may be employed within a quench unit or scrubber designed to provide syngas to a gas turbine without an HRSG system. In another example, the flow damping mechanisms may be employed within a quench unit or scrubber that is part of a separate gasification system.

Figure 16:
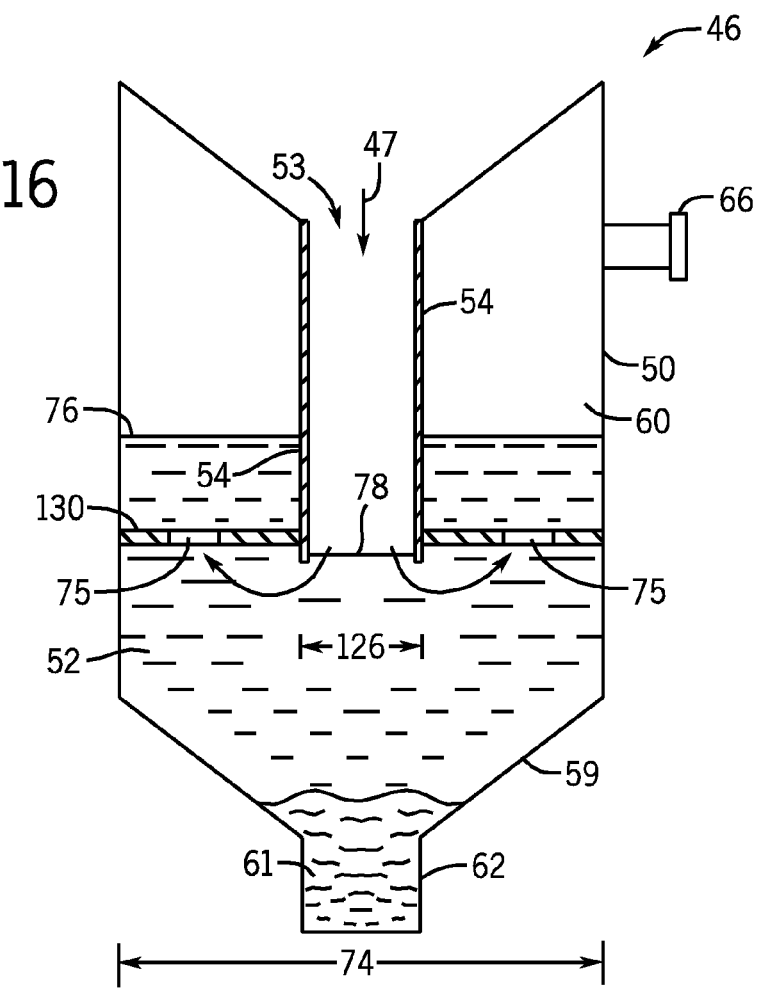
FIG. 16 is a front cross-sectional view of an embodiment of a gasification system component of FIG. 1 without a draft tube and employing a damping plate.
Figure 17:
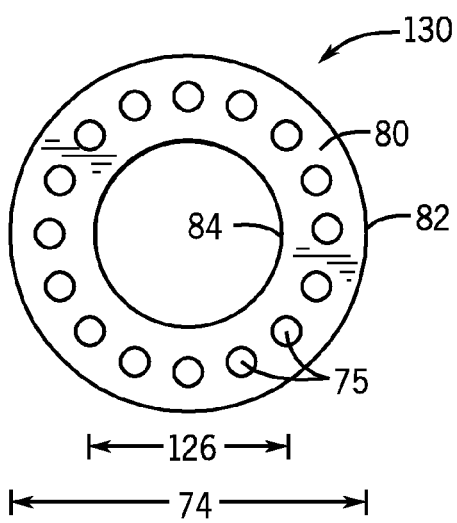
FIG. 17 is a top view of the damping plate of FIG. 18.
Figure 18:
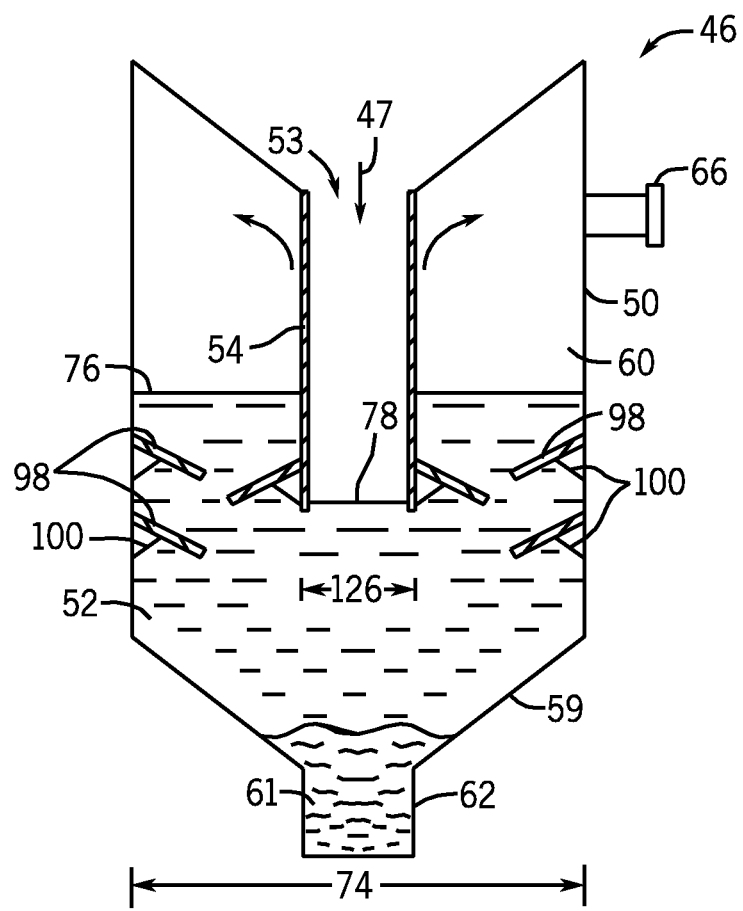
FIG. 18 is a front cross-sectional view of an embodiment of a gasification system component of FIG. 1 without a draft tube and employing damping rings.

FIGS. 2-18 depict embodiments of a gasification system component 46. The gasification system component 46 may represent the quench unit 14 or the scrubber 19 shown in FIG. 1, as well as other types of gasification quench units and/or scrubbers. Moreover, although FIGS. 2-15 are generally described in the context of a quench unit, the flow damping mechanisms shown in these figures may be applied in a similar manner within a gasification scrubber. Further, although FIGS. 16-18 are generally described in the context of a scrubber, the flow damping mechanisms shown in these figures may be applied in a similar manner within a gasification quench unit.

Figure 2:
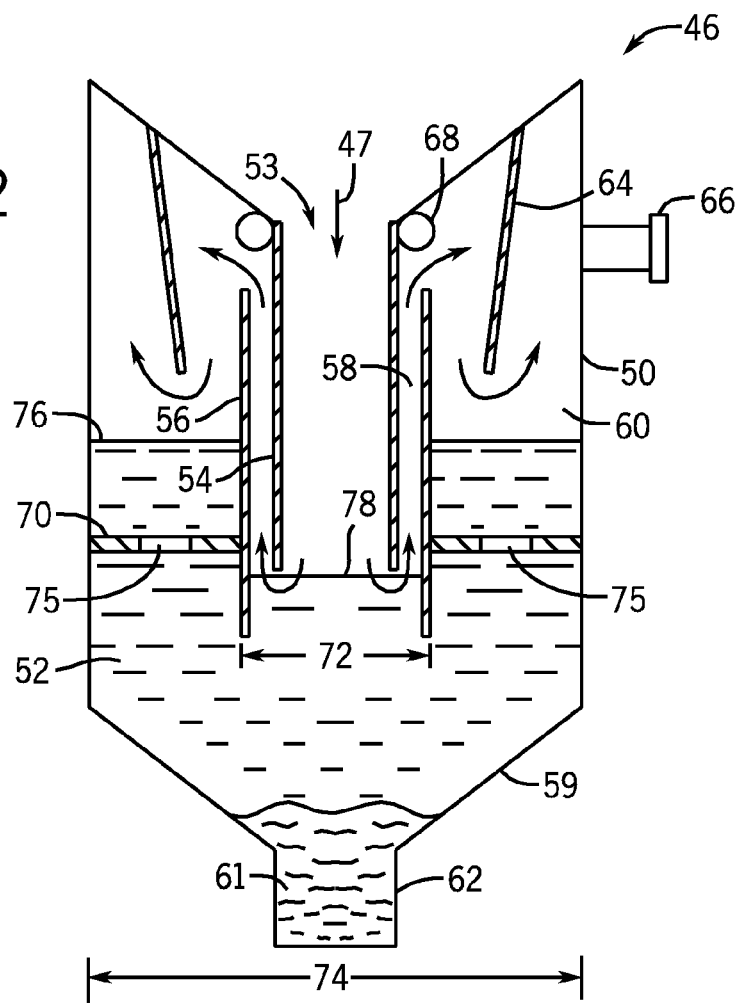
FIG. 2 is a front cross-sectional view of an embodiment of a gasification system component of FIG. 1 employing a damping plate.

FIG. 2 is a cross-sectional view of one embodiment of a gasification system component 46. As noted above, the gasification system component 46 may be a quench unit or a scrubber, such as the quench unit 14 or the scrubber 19. The gasification system component 46 includes a vessel 50 that retains a pool of cooling fluid 52, such as water. The gasification system component 46 may receive syngas 47 from an upstream component within the gasification system 8 (FIG. 1) through an opening 53. For example, if the gasification system component 46 represents the quench unit 14 (FIG. 1), the syngas 47, may represent the syngas 13 (FIG. 1) received from the gasifier 11 (FIG. 1). In another example, if the gasification system component 46 represents the scrubber 19 (FIG. 1), the syngas 47 may represent the syngas 17 (FIG. 1) exiting the quench unit 14 (FIG. 1). The syngas 47 may flow into the opening 53 within the gasification system component 46 through and inlet (not shown) within the top and/or sides of the vessel 50.

The cooling fluid 52 may be supplied to the vessel 50 from a water source (not shown) and replenished as needed to maintain a sufficient level for cooling within the vessel 50. As shown, the vessel 50 also includes two annular tubes 54 and 56. In certain embodiments, the tube 56 may be disposed concentrically around the tube 54. The dip tube 54 is disposed within the center of the vessel 50 to guide syngas 47 through the gasification system component 46. The draft tube 56 encircles the dip tube 54 to create an inner chamber 58. As shown generally by the arrows, the syngas 47 may flow through the dip tube 54 towards the pool of cooling fluid 52 contained within a lower and/or conical section 59 of the vessel 50. The syngas 47 may contact the cooling fluid 52, causing some of the cooling fluid to evaporate, thereby cooling the syngas 47.

From the dip tube 54, the syngas may flow up through the inner chamber 58 to an outer chamber 60. The outer chamber 60 may be generally formed in the annular space between the draft tube 56 and the walls of the vessel 50. However, in other embodiments, the draft tube 56 may be omitted as shown and described below with respect to FIGS. 16 and 18. In these embodiments, the syngas may flow up through the outer chamber 60, which in these embodiments may extend in the annular space between the dip tube 54 and the walls of the vessel 50. In other words, in these embodiments, the inner chamber 58 and the outer chamber 60 may be combined into one continuous outer chamber 60 extending from the dip tube 54 to the walls of the vessel 50.

As the syngas 47 flows thorough the dip tube 54, the inner chamber 58, and the outer chamber 60, the syngas may be cooled by the cooling fluid 52 to reduce the temperature and pressure of the syngas. As the syngas is cooled, particulates 61, such as the slag 16, may collect within the bottom portion of the vessel 50 and may be discharged through a discharge port 62, which in certain embodiments, may lead to a lock hopper. Moreover, entrained liquid may be removed from the syngas 47 and may collect within the pool of the cooling fluid 52.

The upper portion of the chamber 60 may include an optional annular baffle 64 disposed around the draft tube 56. According to certain embodiments, the baffle 64 may be designed to direct the flow of syngas through the chamber 60, which in certain embodiments, may increase the flow path of the syngas, thereby facilitating cooling of the syngas. The baffle 64 also may provide a surface for coalescing liquid entrained in the syngas, thereby reducing entrainment of cooling liquid in the syngas exiting the chamber 60 through an outlet 66. An optional quench ring 68 may be disposed annularly about the dip tube 54 and may direct cooling fluid towards the inner surface of the dip tube 54 to protect the dip tube inner surface from the hot syngas 47. The quench ring 68 also may direct cooling fluid towards the baffle 64 and/or towards the pool of cooling fluid 52. However, in certain embodiments, for example, where the gasification system component 46 represents the scrubber 19, the baffle 64 and the quench ring 68 may be omitted.

To reduce flow fluctuations within the gasification system component 46, an annular damping plate 70 extends within the outer chamber 60 between the walls of the vessel 50 and the draft tube 56. As the syngas flows within the gasification system component 46, water from the quench ring 68 may flow through the gasification system component 46 and collect in the liquid pool 52. The damping plate 70 may be designed to dissipate energy from flow fluctuations within the pool of cooling liquid 52. The damping plate 70 may have an inner diameter 72 that generally corresponds to the outer diameter of the draft tube 56. The damping plate 70 may have an outer diameter 74 that generally corresponds to the inner diameter of the vessel 50. Accordingly, the damping plate 70 may be contiguously disposed with the walls of the vessel 50 and the draft tube 56 to restrict the flow of cooling liquid 52 through the outer chamber 60. The damping plate 70 may be affixed to the walls of the vessel 50 and/or the draft tube 56 by welding, bolting, or other suitable means.

Holes 75 within the damping plate 70 may allow the cooling fluid 52 to flow through the damping plate 70. However, the flow area provided by the holes 75 through the chamber 60 may be significantly less than the flow area within sections of the chamber 60 unrestricted by the damping plate 70. According to certain embodiments, the damping plate 70 may act as a flow restriction mechanism that reduces the flow area through the damping plate portion of the outer chamber 60 by at least approximately 50-100 percent, and all subranges therebetween. More specifically, the damping plate 70 may act as a flow restriction mechanism that reducing the flow area through the damping plate portion of the outer chamber by at least approximately 80-100 percent, and all subranges therebetween.

The damping plate 70 may generally be disposed within the outer chamber 60 such that the damping plate 70 is submerged within the pool of cooling fluid 52. For example, the damping plate 70 may be disposed below a level 76 of the cooling fluid pool 52 within the outer chamber 60. In certain embodiments, the damping plate 70 may be disposed above a level 78 of the cooling fluid pool 52 within the draft tube 56. However, in other embodiments, the damping plate 70 may be disposed below the level 78 of the cooling fluid pool 52 within the draft tube 56. Moreover, the damping plate 70 may generally be disposed at a sufficient height above the conical section 59 of the vessel 50 to impede accumulation of slag within the holes of the damping plate.

The levels 76 and 78 of the cooling fluid within the pool 52 may vary during operation of the gasification system component 46. In certain embodiments, the flow rate of the syngas 47 through the gasification system component 46 may vary, causing fluctuations in the levels 76 and 78. Moreover, in certain embodiments, the syngas 47 may flow into the pool 52, agitating the cooling fluid, thereby causing fluctuations in the levels 76 and 78. Further, the flow rate of the cooling fluid exiting the quench ring 68 may vary. The damping plate 70 may be designed to reduce fluctuations in the level 76 and/or in the level 78. Specifically, the damping plate 70 may provide a flow restriction that serves to dissipate energy from flow dynamics within the cooling fluid pool 52.

Figure 3:
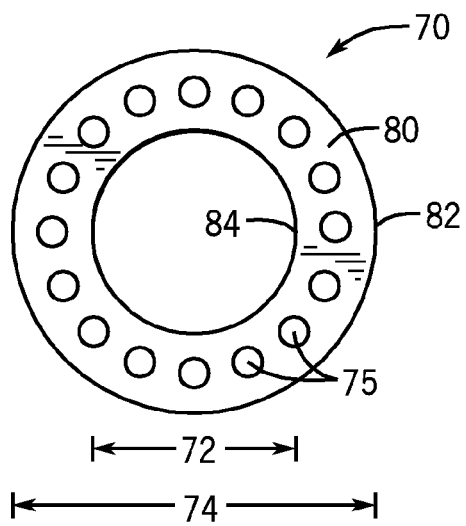
FIG. 3 is a top view of the damping plate of FIG. 2.

FIG. 3 is a top view of the damping plate 70. The damping plate includes a surface area 80 generally defined by the difference between the outer diameter 74 and the inner diameter 72. The holes 75 may be spaced circumferentially around the surface area 80. As noted above, the surface area 80 and the area of the holes 75 may generally correspond to the total annular flow area available for water to pass through the outer chamber 60 vertically within the vessel 50. As described above with respect to FIG. 2, the damping plate 70 may be designed to restrict the flow area to the area provided by the holes 75 that are disposed within the surface area 80. According to certain embodiments, the area of the holes 75 may represent approximately 1-50% of the total annular flow area available, as defined by the surface area 80 and the holes 75. Within the damping plate 70, the number, spacing, sizes, and shapes of the holes 75 may vary. For example, the holes 75 may have a circular, oblong, elliptical, rectangular, square, or hexagonal cross-section, among others. Further, any number of holes of various shapes and sizes may be included within the damping plate. For example, the size and number of the holes 75 may be adjusted to provide a desired reduction in flow area while providing holes large enough to resist plugging.

Figure 4:
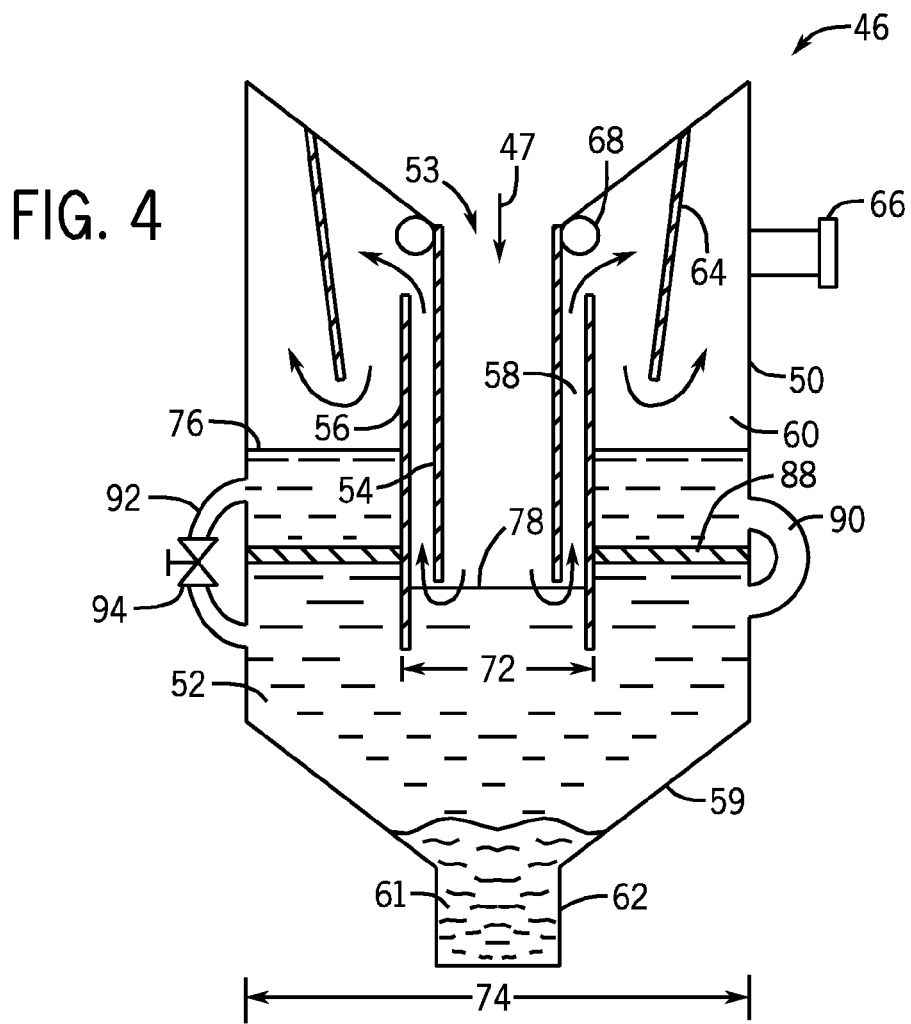
FIG. 4 is a front cross-sectional view of another embodiment of the gasification system component of FIG. 1 employing a damping plate.

FIG. 4 depicts another type of damping plate 88 that may be disposed within the gasification system component 46. Similar to the damping plate 70, the damping plate 88 may be disposed annularly between the walls of the vessel 50 and the draft tube 56. However, in this embodiment, the damping plate 88 may be a continuous piece without holes disposed within the surface area. Moreover, in other embodiments, the draft tube 56 may be omitted, and the damping plate 88 may be a continuous annular piece disposed between the walls of the vessel 50 and the dip tube 54.

Bypass lines 90 and 92 may be included within the vessel 50 to allow the cooling fluid to pass around the damping plate 88. The diameter and/or number of the tubes 90 and 92 may vary depending on the amount of flow area desired around the damping plate 88. For example, multiple tubes 90 and 92 may be spaced circumferentially around the vessel 50. In certain embodiments the bypass tube 92 may include a valve 94, such as a solenoid valve, ball valve, gate valve, or the like, that may be adjusted to vary the flow through the bypass tubes 92. However, in other embodiments, only tubes without valves 94 may be employed. Moreover, in certain embodiments, valves 94 may be included within each of the bypass tubes 90 and 92. The valve positions may be adjusted, for example, by a controller, to vary the amount of cooling fluid that passes through the bypass tubes 92.

Figure 5:
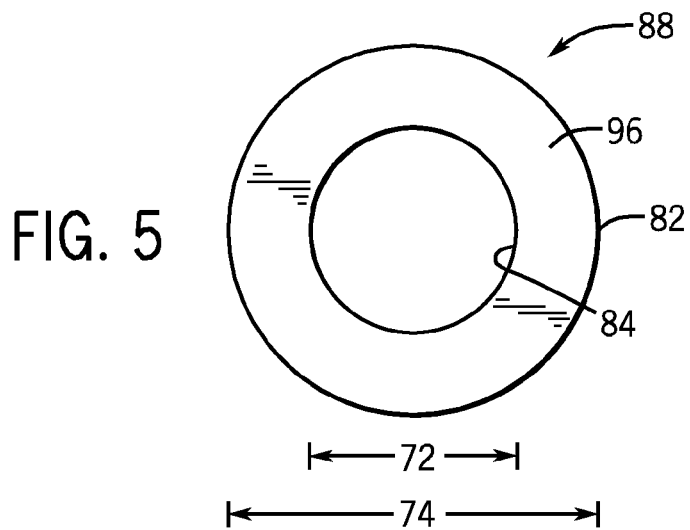
FIG. 5 is a top view of the damping plate of FIG. 4.

FIG. 5 is a top view of the damping plate 88. Similar to the damping plate 70, the outer circumference 82 may be disposed contiguously against the walls of the vessel 50 and the inner circumference 84 may be disposed contiguously around the draft tube 56. The damping plate 88 may be welded, bolted, or otherwise affixed to the walls of the vessel 50 and/or the draft tube 56. As noted above, the damping plate 88 includes a continuous surface area 96 without holes. Accordingly, the cooling fluid is directed through the bypass tubes 90 and/or 92 rather than through the damping plate 88.

Figure 6:
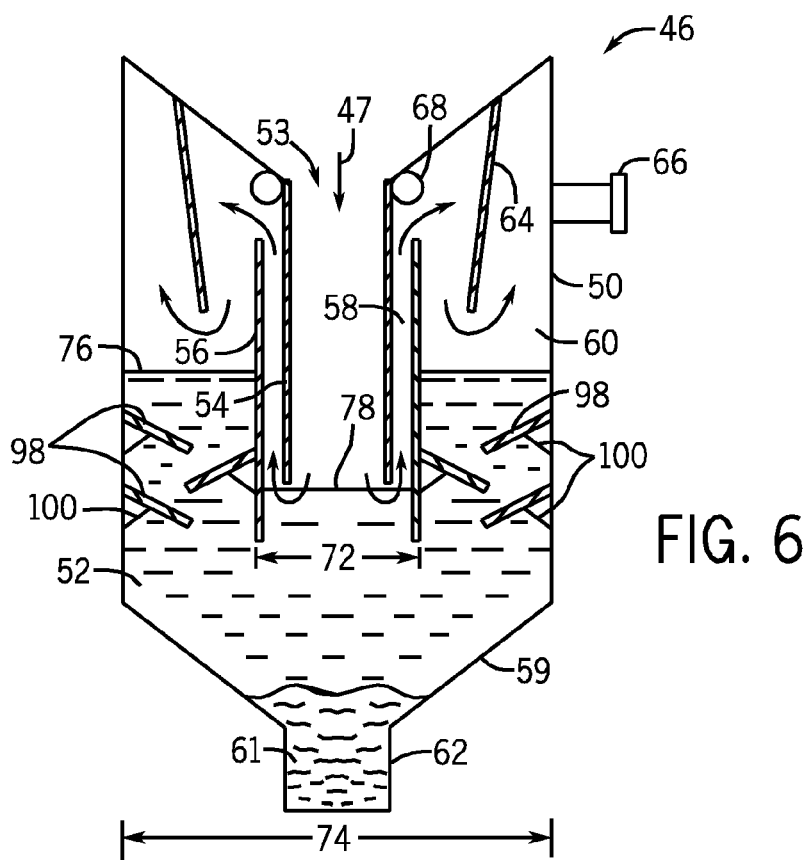
FIG. 6 is a front cross-sectional view of an embodiment of a gasification system component of FIG. 1 employing damping rings.

FIG. 6 depicts another type of damping mechanism, damping rings 98, that may be employed within the gasification system component 46. The damping rings 98 may include annular rings extending circumferentially through the entire outer chamber 60, or the damping rings 98 may include curved segments extending through portions of the outer chamber 60. However, according to certain embodiments the damping rings 98 may be disposed symmetrically within the chamber 60 to balance the load distribution. The damping rings 98 may be disposed against the vessel walls 50 and/or the draft tube 56. Moreover, as discussed below with respect to FIG. 18, in certain embodiments, the damping rings 98 may be disposed against the dip tube 54.

Each damping ring 98 may extend only partially between the vessel walls 50 and the draft tube 56. As shown, two damping rings 98 are disposed contiguous to the walls of the vessel 50 and one damping ring is disposed contiguous to the draft tube 56. In certain embodiments, the damping rings 98 may be designed to interface with one another for form a tortuous flow path for the cooling fluid 52 through the outer chamber 60. The tortuous flow path may be designed to reduce flow fluctuations. Moreover, the damping rings 98 may be angled toward the conical section 59 to inhibit the collection of deposits on the damping rings 98.

In other embodiments, the number and/or relative locations of the damping rings 98 may vary. For example, one, two, three, four, or more damping rings 98 may be affixed to the walls of the vessel 50, the draft tube 56, or both. Further, the angle of the damping rings 98 may vary. For example, the damping rings 98 may extend orthogonally from the walls of the vessel 50, or the damping rings 98 may be declined towards the conical section 59 of the vessel 50 at various angles. In certain embodiments, the damping rings 98 may be supported by supports 100 extending from the damping rings towards the vessel 50 and the draft tube 56. The damping rings 98 and/or the supports 100 may be welded, bolted, or otherwise affixed to the walls of the vessel 50 and/or the draft tube 56.

Figure 7:
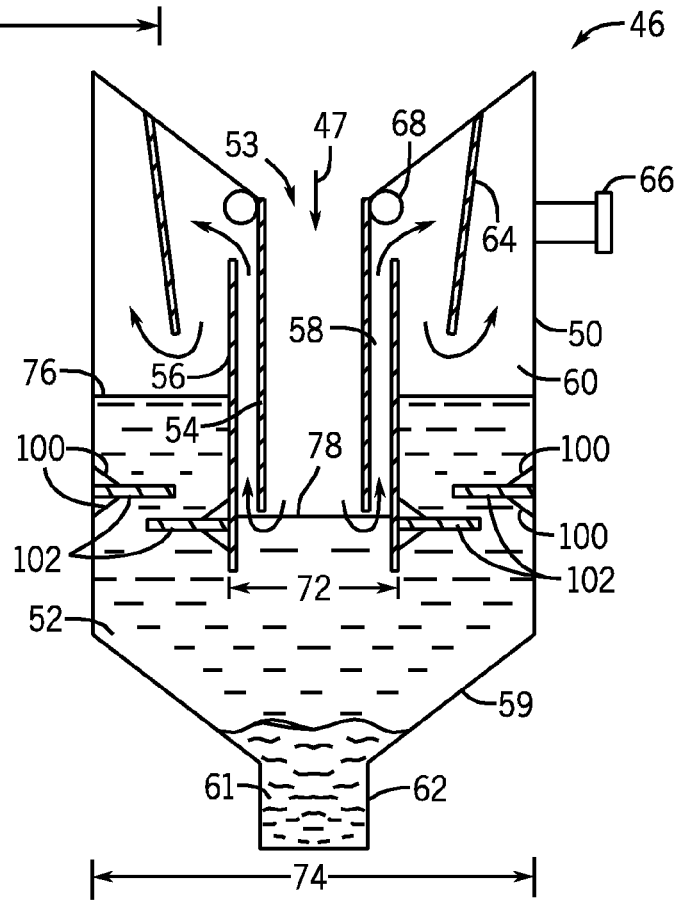
FIG. 7 is a front cross-sectional view of an embodiment of the gasification system component of FIG. 1 employing damping bars.

FIG. 7 depicts another type of flow damping mechanism employed within the gasification system component 46. Specifically, the gasification system component 46 includes damping bars 102 affixed to the walls of the vessel 50 and/or the draft tube 56. The damping bars 102 may extend generally orthogonal to the vessel 50 and the draft tube 56 towards one another to create a tortuous path for the water flowing within the outer chamber 60. The damping bars 102 may be welded, bolted, or otherwise affixed to the vessel 50 and/or the draft tube 56. Moreover, supports 100 may be provided above and/or below the damping bars 102 to provide mechanical support and further secure the damping bars 102 to the walls of the vessel 50 and/or the draft tube 56. However, in other embodiments, the supports 100 may be omitted. Further, any number of damping bars 102 may be employed and disposed circumferentially around the vessel 50 and/or the draft tube 56. Moreover, in embodiments where the draft tube 56 is omitted, some or all of the damping bars 102 may be affixed to the dip tube 54.

Figure 8:
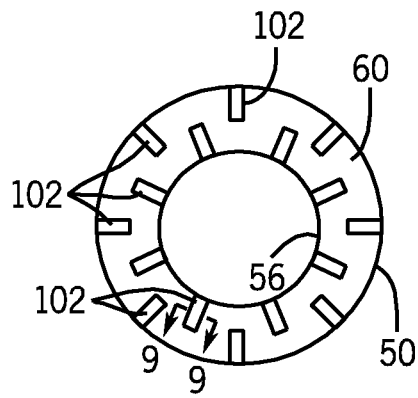
FIG. 8 is a top view of the gasification system component of FIG. 7.

FIG. 8 is a top view of the gasification system component 46 and the damping bars 102. Damping bars 102 are spaced circumferentially around the vessel 50 to project inwardly towards the draft tube 56. Damping bars 102 are also spaced circumferentially around the draft tube 56 to extend outwardly towards the walls of the vessel 50. As shown, the damping bars 102 on the vessel 50 are disposed in between the damping bars 102 extending from the draft tube 56. That is, the damping bars 102 are alternately coupled to the walls of the vessel 50 and the draft tube 56. However, in other embodiments the damping bars 102 may be circumferentially aligned. Moreover, the number of damping bars 102 located on the vessel 50 and the draft tube 56 may vary.

Figure 9:
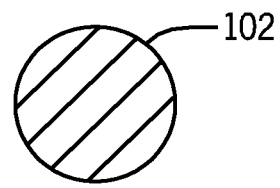
FIG. 9 is a cross-sectional view of an embodiment of one of the damping bars of FIG. 8.

FIG. 9 is a sectional view taken through one of the damping bars 102 to illustrate an exemplary cross section of one of the damping bars 102. As shown, the damping bars 102 may be generally circular in cross section. However, in other embodiments the cross-section may vary. For example, the damping bars 102 may have a rectangular, triangular, trapezoidal, hexagonal, or square cross section. Moreover, various cross sections may be employed to minimize depositions and/or to adjust the flow resistance provided by the damping bars 102.

Figure 10:
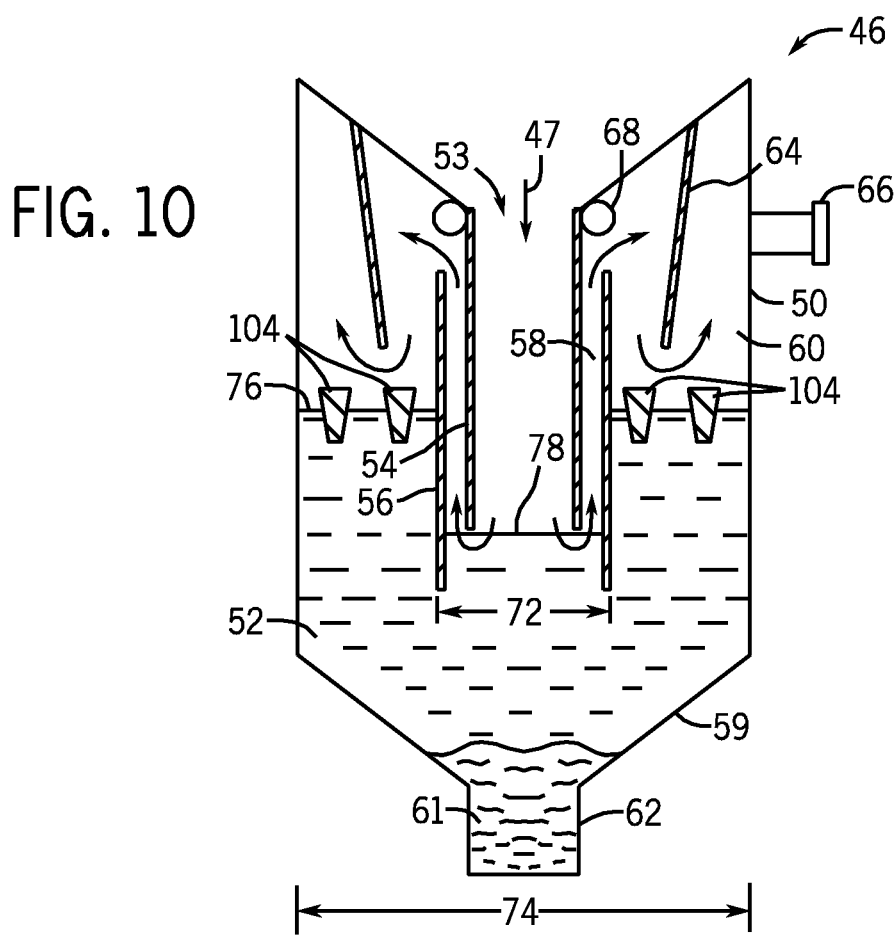
FIG. 10 is a front cross-sectional view of an embodiment of a gasification system component of FIG. 1 employing floating blocks.

FIG. 10 depicts another embodiment of the gasification system component 46 that employs floating blocks 104 as flow damping mechanisms. The floating blocks 104 may be disposed in the outer chamber 60 and may be designed to float on the surface of the cooling fluid pool 52. The floating blocks 104 may be generally designed to increase the inertia and friction forces within the outer chamber 60, thereby reducing flow fluctuations. In certain embodiments, the floating blocks 104 may be constructed of steel or other suitable material designed to withstand the pressures and temperatures reigning within the vessel 50. Furthermore, the floating blocks 104 may include a hollow portion designed to promote flotation of the blocks 104. As shown, the blocks have a generally trapezoidal shape; however, in other embodiments, various shapes, sizes, and structures may be employed. Furthermore, any number of floating blocks 104 may be included within the outer chamber 60. Moreover, in certain embodiments the number of floating blocks included within the quench unit may be varied depending on the operating conditions experienced within the quench unit. For example, if more flow damping is desired, additional floating blocks 104 may be added. On the other hand, if less flow damping is desired, some of the floating blocks 104 may be removed.

Figure 11:
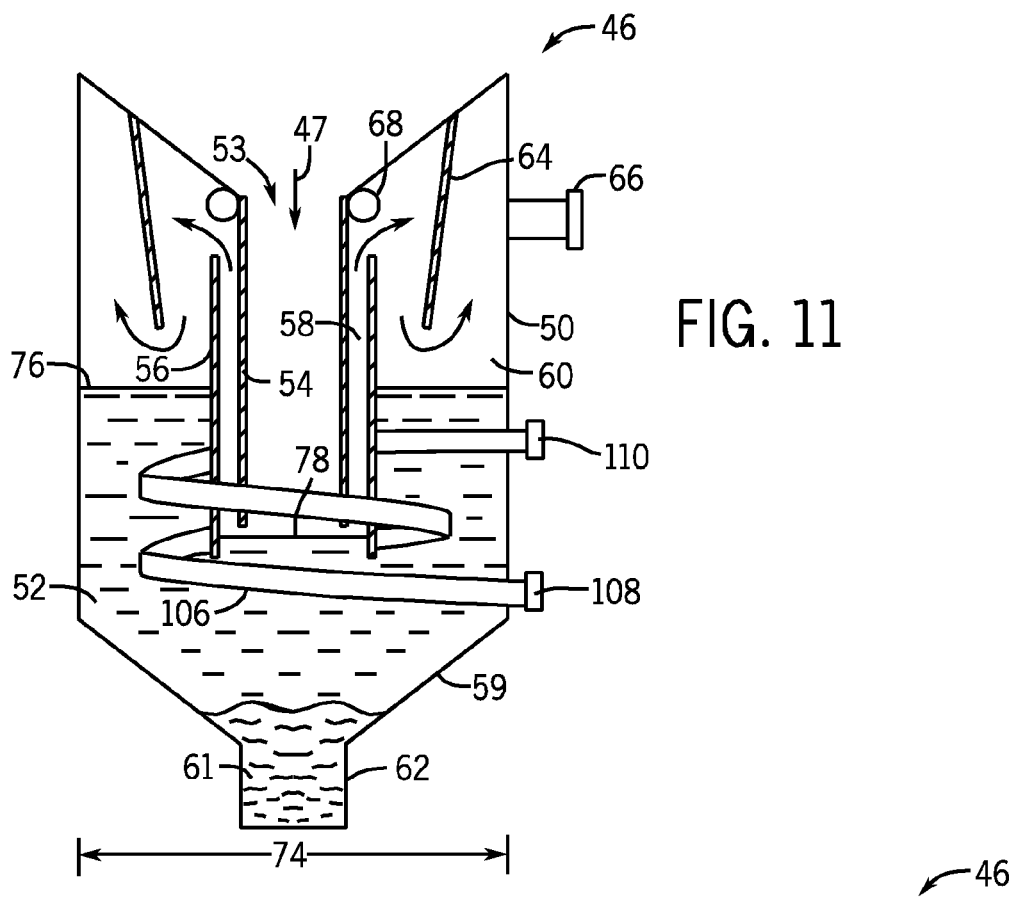
FIG. 11 is a front cross-sectional view of an embodiment of a gasification system component of FIG. 1 employing a heat exchanger.

FIG. 11 depicts an embodiment of the gasification system component 46 with a heat exchanger coil 106 disposed in the outer chamber 60 to provide flow damping. The heat exchanger coil 106 may be disposed helically around the draft tube 56 and/or the dip tube 54 and may provide resistance to flow fluctuations within the cooling fluid pool 52. Specifically, the outer profile of the heat exchanger coil 106 may be designed to function as a damping device. In addition to providing damping, the heat exchanger coil 106 also may be used to extract heat from the cooling fluid pool 52. Specifically, the heat exchanger coil 106 may receive flow of a cooling fluid through an inlet 108 and may circulate the fluid through the coil 106 to an outlet 110. Any suitable heat transfer fluid, such as refrigerant, water, glycol, or brine, among others, may be employed. As the cooling fluid flows thought the coil 106, the fluid may absorb heat from the cooling fluid pool 52. The heated cooling fluid from the coil 106 may then be used to provide heat to another portion of the IGCC system 8. For example, the heat exchanger coil 106 may be used as part of a waste heat recovery process to provide heat to an industrial process or application employing low temperature heat. In one example, the heat may be used to provide preheating for the steam turbine 35 and/or the HRSG system 23, shown in FIG. 1.

Figure 12:
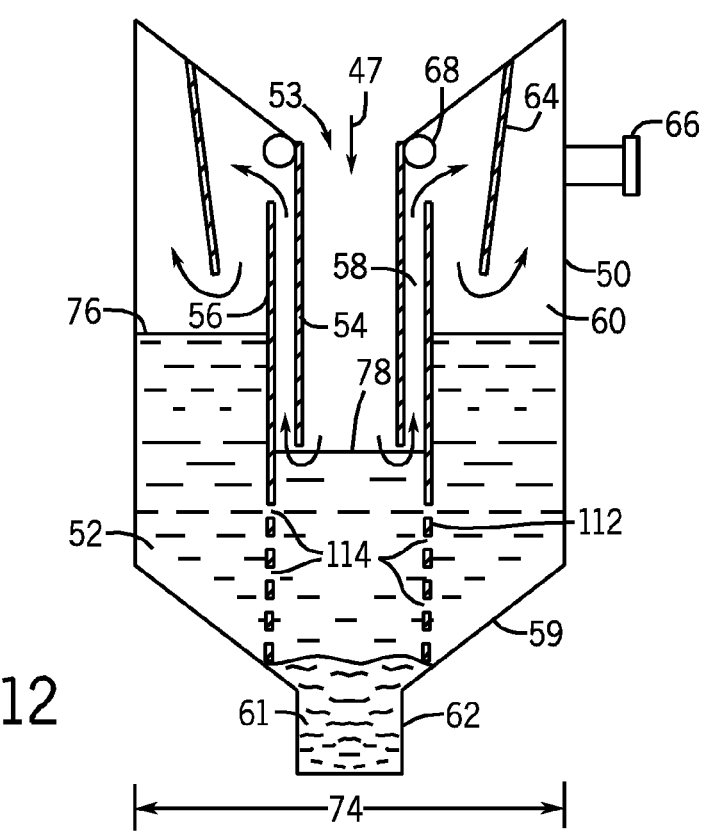
FIG. 12 is a front cross-sectional view of an embodiment of the gasification system component of FIG. 1 employing a perforated draft tube extension.

FIG. 12 depicts a flow damping mechanism disposed between the inner chamber 58 and the outer chamber 60. Specifically, the draft tube 56 may include an extension 112 that provides a flow restriction between the inner chamber 58 and the outer chamber 60 within and/or just above the conical section 59. The extension 112 connects the draft tube 56 to the conical section 59 of the vessel 50. The extension 112 may be an annular structure with a diameter corresponding to the diameter of the draft tube 56. Holes 114 may be included within the extension 112 to allow passage of the cooling fluid between the inner chamber 58 and the outer chamber 60. The holes 114 may serve to restrict the flow of fluid between the inner and outer chambers 58 and 60. The holes 114 may be of a sufficient size to inhibit plugging of the holes 114 by the slag 16 that may collect within the bottom of the vessel 50 and the discharge port 62. Further, the number and/or the sizes of the holes 114 may be varied to adjust the amount of damping provided by the extension 112.

In summary, FIGS. 2-12 generally depict flow damping mechanisms disposed within the cooling fluid pool 52 in the outer chamber 60 and/or between the inner chamber 58 and the outer chamber 60. These flow damping mechanisms may be designed to reduce flow fluctuations by restricting flow of the cooling fluid 52 within the vessel 50. However, in other embodiments, flow damping mechanisms may be disposed in the inner chamber 58 to affect the flow of the syngas 47 and/or the cooling fluid 52 flowing through the inner chamber 58. In particular, the flow restrictions described in FIGS. 13-17, may be designed to increase or decrease the pressure drop that occurs across the inner chamber 58. In certain embodiments, the flow damping mechanisms may be designed to increase the pressure drop, thereby limiting the flow fluctuations. However, in other embodiments, the flow damping mechanisms may be designed to decrease the pressure drop.

Figure 13:
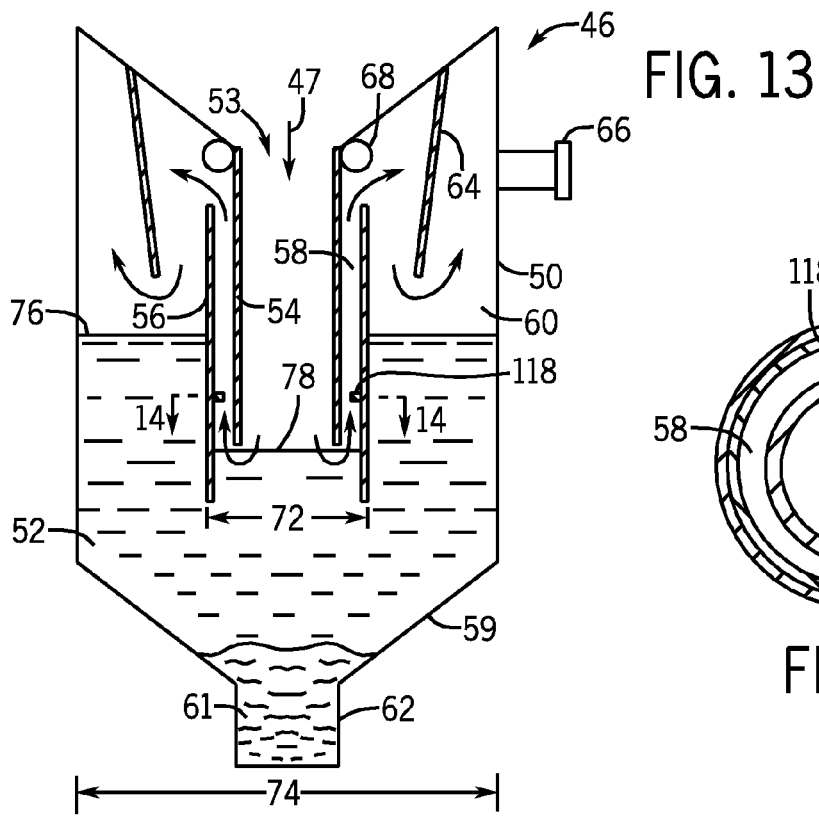
FIG. 13 is a front cross-sectional view of an embodiment of a gasification system component of FIG. 1 employing a damping ring in an annular chamber.

FIG. 13 depicts a damping ring 118 disposed within the inner chamber 58. The ring 118 may include an annular structure disposed concentrically within the space between the draft tube 56 and the dip tube 54. As shown, the ring 118 is mounted or otherwise affixed to the inner surface of the draft tube 56. However, in other embodiments, the ring 118 may be affixed to the outer surface of the dip tube 54. The ring 118 may be designed to add resistance to the flow of fluid, such as the syngas 47 or the cooling fluid 52, within the inner chamber 58, which in turn may increase the pressure drop across the inner chamber 58 to reduce flow fluctuations.

Figure 14:
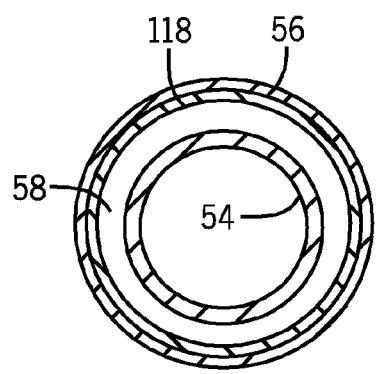
FIG. 14 is a top view of a portion of the gasification system component of FIG. 13.

FIG. 14 is a top view of the gasification system component 46 illustrating the ring 118 disposed within the inner chamber 58. Specifically, the ring 118 is welded, bolted, or otherwise affixed annularly within the inner surface of the draft tube 56 to reduce the flow area through the annular inner chamber 58.

Figure 15:
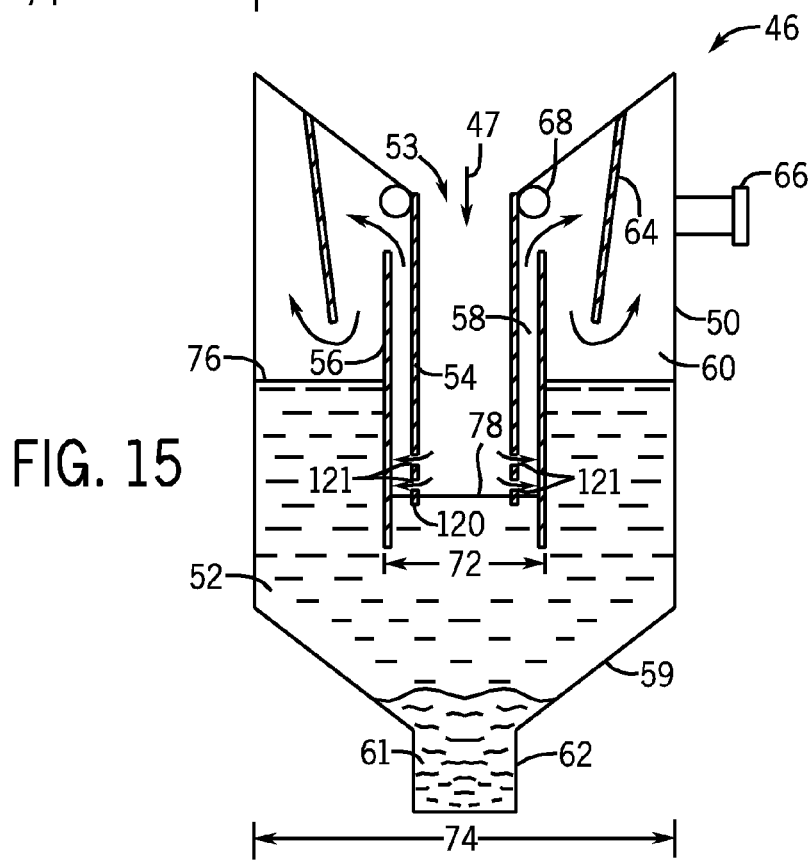
FIG. 15 is a front cross-sectional view of an embodiment of a gasification system component of FIG. 1 employing a perforated dip tube.

FIG. 15 depicts another embodiment of the gasification system component 46 with a dip tube 54 that includes a perforated section 120. Specifically, the perforated section 120 may include a series of holes 121 disposed circumferentially around the dip tube 54 in one or more rows. The holes 121 may permit the syngas to flow through the perforations in the dip tube, which may alter the flow profile of the gas through the inner chamber 58. Specifically, a portion of the syngas 47 may flow directly through the walls of the dip tube 54 into the inner chamber 58 bypassing the lower portions of the inner chamber 58 that includes the pool of cooling fluid 52. The perforations may allow multiple flow paths of the syngas along the length of the dip tube 54 rather than directing the syngas along the bottom annular circumference of the dip tube 54. The holes 121 may be of a sufficient size to inhibit plugging of ash depositions. Moreover, as the cooling fluid pool level 78 rises, the holes 121 may allow the cooling fluid 52 to flow through the holes 121 into the inner chamber 58. In other words, as the level 78 of the cooling fluid 52 rises to encompass the dip tube 54, the syngas 47 may flow into the inner chamber 58 through the upper row of holes 121 while the water may flow through the lower rows of holes 121. Any number of rows of holes 121 may be included. Furthermore the diameter and number of holes may vary.

FIGS. 16-18 depict embodiments of the gasification system component 46 with the draft tube 56 omitted. In these embodiments, the baffle 64 and the quench ring 68 have also been omitted to generally depict a scrubber, such as the scrubber 19 shown in FIG. 1. However, in other embodiments, the flow damping mechanisms depicted in FIGS. 16-18 also may be employed within a quench unit, such as the quench unit 14 shown in FIG. 1.

As shown in FIG. 16, the syngas 47 may flow through the dip tube 54 within the vessel 50 as shown generally by the arrows. The syngas 47 may then exit the dip tube 54 and flow through the pool of cooling fluid 52 contained within a conical section 59 of the vessel 50. The syngas 47 may contact the cooling fluid 52, causing some of the cooling fluid to evaporate, thereby cooling the syngas 47 and removing entrained particulates and/or water from the syngas 47.

From the dip tube 54, the syngas may flow up through the outer chamber 60. The outer chamber 60 may be generally formed in the annular space between the dip tube 54 and the walls of the vessel 50. To reduce flow fluctuations within the gasification system component 46, an annular damping plate 130 extends within the outer chamber 60 between the walls of the vessel 50 and the dip tube 54. Similar to the damping plate 70 shown in FIG. 2, the damping plate 130 may be designed to dissipate energy from flow fluctuations within the pool of cooling liquid 52. The damping plate 130 may have an inner diameter 126 that generally corresponds to the outer diameter of the dip tube 54. The damping plate 130 may have an outer diameter 74 that generally corresponds to the inner diameter of the vessel 50. Accordingly, the damping plate 70 may be contiguously disposed with the walls of the vessel 50 and the dip tube 54 to restrict the flow of cooling liquid 52 through the outer chamber 60. The damping plate 130 may be affixed to the walls of the vessel 50 and/or the dip tube 54 by welding, bolting, or other suitable means.

Holes 75 within the damping plate 130 may allow the cooling fluid 52 to flow through the damping plate 130. However, the flow area provided by the holes 75 through the chamber 60 may be significantly less than the flow area within sections of the chamber 60 unrestricted by the damping plate 130. According to certain embodiments, the damping plate 130 may act as a flow restriction mechanism that reduces the flow area through the damping plate portion of the outer chamber 60 by at least approximately 50-100 percent, and all subranges therebetween. More specifically, the damping plate 130 may act as a flow restriction mechanism that reducing the flow area through the damping plate portion of the outer chamber by at least approximately 80-100 percent, and all subranges therebetween.

The damping plate 130 may generally be disposed within the outer chamber 60 such that the damping plate 130 is submerged within the pool of cooling fluid 52. For example, the damping plate 130 may be disposed below a level 76 of the cooling fluid pool 52 within the outer chamber 60. In certain embodiments, the damping plate 70 may be disposed above a level 78 of the cooling fluid pool 52 within the dip tube 54. However, in other embodiments, the damping plate 130 may be disposed below the level 78 of the cooling fluid pool 52 within the dip tube 54. Moreover, the damping plate 130 may generally be disposed at a sufficient height above the conical section 59 of the vessel 50 to impede accumulation of particulates within the holes of the damping plate.

FIG. 17 is a top view of the damping plate 130. The damping plate includes a surface area 80 generally defined by the difference between the outer diameter 74 and the inner diameter 126. The holes 75 may be spaced circumferentially around the surface area 80. As noted above, the surface area 80 and the area of the holes 75 may generally correspond to the total annular flow area available for water to pass through the outer chamber 60 vertically within the vessel 50. As described above with respect to FIG. 16, the damping plate 70 may be designed to restrict the flow area to the area provided by the holes 75 that are disposed within the surface area 80. According to certain embodiments, the area of the holes 75 may represent approximately 1-50% of the total annular flow area available, as defined by the surface area 80 and the holes 75. Within the damping plate 130, the number, spacing, sizes, and shapes of the holes 75 may vary. For example, the holes 75 may have a circular, oblong, elliptical, rectangular, square, or hexagonal cross-section, among others. Further, any number of holes of various shapes and sizes may be included within the damping plate. For example, the size and number of the holes 75 may be adjusted to provide a desired reduction in flow area while providing holes large enough to resist plugging.

FIG. 18 depicts the damping rings 98 employed within the gasification system component 46 with the draft tube 56 omitted. The damping rings 98 may be disposed against the vessel walls 50 and/or the dip tube 54. Each damping ring 98 may extend only partially between the vessel walls 50 and the dip tube 54. As shown, two damping rings 98 are disposed contiguous to the walls of the vessel 50 and one damping ring is disposed contiguous to the dip tube 54. In certain embodiments, the damping rings 98 may be designed to interface with one another for form a tortuous flow path for the cooling fluid 52 through the outer chamber 60. The tortuous flow path may be designed to reduce flow fluctuations. Moreover, the damping rings 98 may be angled toward the conical section 59 to inhibit the collection of deposits on the damping rings 98.

In other embodiments, the number and/or relative locations of the damping rings 98 may vary. For example, one, two, three, four, or more damping rings 98 may be affixed to the walls of the vessel 50, the dip tube 54, or both. Further, the angle of the damping rings 98 may vary. For example, the damping rings 98 may extend orthogonally from the walls of the vessel 50, or the damping rings 98 may be declined towards the conical section 59 of the vessel 50 at various angles. In certain embodiments, the damping rings 98 may be supported by supports 100 extending from the damping rings towards the vessel 50 and the dip tube 54. The damping rings 98 and/or the supports 100 may be welded, bolted, or otherwise affixed to the walls of the vessel 50 and/or the dip tube 54.

The flow damping mechanisms depicted in FIGS. 2-18 may be employed separately or in combination with one another. Moreover, as may be appreciated, the relative sizes, shapes, and geometries of the flow damping mechanisms may vary. Further, certain components, such as the draft tube 56 and/or the quench ring 68 may be omitted. The flow damping mechanisms may be employed in the gasification system component 46 during the initial manufacturing, or the flow damping mechanisms may be retrofit into existing gasification system components 46. Further, the flow damping mechanisms may be adjusted based on operational parameters, such as the type of carbonaceous fuel, the system efficiency, the system load, or environmental conditions, among others to achieve the desired amount of flow damping.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A gasification system component comprising:
   a pool of cooling fluid;
   a vessel configured to retain the pool of a cooling fluid;
   a dip tube disposed in the vessel to direct another fluid towards the pool;
   a draft tube encircling the dip tube to form an inner chamber between the dip tube and the draft tube and an outer chamber between the draft tube and the vessel walls; and
   a flow damping mechanism comprising:
      a first annular ring disposed contiguous to the vessel; and
      a second annular ring disposed contiguous to the draft tube, wherein the first and second annular rings are configured to form a tortuous flow path for the cooling fluid through the outer chamber to dampen flow of the cooling fluid, or the another fluid, or both within the gasification system component, and wherein a level of the cooling fluid in the pool is high enough that the first and second annular rings extend below the surface of the pool.

2. The gasification system component of claim 1, wherein the gasification system component comprises a quench unit or a scrubber.

3. The gasification system component of claim 1, wherein the first annular ring is situated above the second annular ring, and wherein the damping mechanism further comprises a third annular ring disposed continugous to the vessel and situated below the second annular ring.

4. The gasification system component of claim 1, wherein the first annular ring and the second annular ring are angled towards the lower section.

5. A gasification system component, comprising:
   a pool of cooling fluid;
   a vessel configured to retain the pool of a cooling fluid;
   a dip tube disposed in the vessel to direct another fluid towards the pool and to create an annular chamber between the dip tube and walls of the vessel; and
   a flow damping mechanism comprising:
      a first annular ring disposed contiguous to the vessel; and
      a second annular ring disposed contiguous to the dip tube, wherein the first and second annular rings are configured to form a tortuous flow path for the cooling fluid through the outer chamber to dampen flow of the cooling fluid, or the another fluid, or both within the gasification system component, and wherein a level of the cooling fluid in the pool is high enough that the first and second annular rings extend below the surface of the pool.

6. The gasification system component of claim 5, wherein the first annular ring is situated above the second annular ring, and wherein the damping mechanism further comprises a third annular ring disposed continugous to the vessel and situated below the second annular ring.

7. The gasification system component of claim 5, wherein first annular ring and the second annular ring are angled towards the lower section.

\* \* \* \* \*